United States Patent Office 3,413,263
Patented Nov. 26, 1968

3,413,263
ALKYLPHENONE STABILIZERS, STABILIZED COMPOSITIONS AND METHODS FOR MAKING SAME
Albert F. Strobel, Delmar, and Sigmund C. Catino, Castleton, N.Y., assignors to GAF Corporation, a corporation of Delaware
No Drawing. Filed June 1, 1965, Ser. No. 460,527
6 Claims. (Cl. 260—45.75)

ABSTRACT OF THE DISCLOSURE

Nickel complexes of certain alkylphenones useful as ultra violet light absorbers. Stabilized organic compositions such as solid synthetic polymers containing such nickel complex compounds.

---

This invention relates to new, useful and outstanding alkylphenone type stabilizers, and in particular to 2'-hydroxy-4'-alkoxy alkylphenone compounds which are outstanding ultraviolent light absorbers in the form of their nickel complexes, to compositions stabilized with such compounds, to methods for making such compounds, compositions, and to the uses of such compounds.

It is well known that organic materials to varying degrees undergo deterioration and degeneration when exposed to actinic radiation, and in particular to ultraviolet radiation. While the primary source of ultra-violet radiation is the sun, the problem of protecting organic materials against this source of ultra-violent light is not limited only to materials which are in direct exposure to sunlight since all organic materials during daylight hours are subjected to some degree to the effects of ultra-violet light whether in direct exposure to sunlight or not.

Many compounds are known which have the property of absorbing electromagnetic radiation especially within the range of about 2800 to 4000 A. Such compounds should have utility as absorbers for radiation within this wavelength and consequently might serve to stabilize other organic materials. The problem, however, in the successful adaptation and use of a given ultra-violet light absorbing compound depends upon several factors, however. (1) The compound must absorb strongly within the desired region in order to function properly. (2) The compound must be compatible with the material to be stabilized. (3) Compatibility must be present not only in a physical and chemical sense, but also in a visual sense. Thus, for example, where it is desired to stabilize a clear vinyl film, a deeply colored absorber would not be indicated. (4) The compound must be sufficiently stable to the ultra-violet radiation it itself is absorbing otherwise the practical utility of the compound is nil. (5) The compound must be economically feasible to produce. (6) The compound must be economically feasible to compete with the myriad of other possible ultra-violet light stabilizers.

Obviously, many compounds will serve admirably for one purpose but will be completely useless for another. Thus, sun-screening agents employed in the usual sun-tanning lotions must have high ultra-violet light absorptive capacity but need not be particularly stable since their use is for only a very limited period of time. On the other hand, stabilizers for plastic materials intended for outdoor exposure must have exceptionally high light stability characteristics. Further, the problem of chemical and physical compatibility makes for some compounds excellent absorbers in one type of substrate and in another, substantially no utility.

It is therefore quite clear that the utility of any particular compound as an ultra-violet light absorber for any specific purpose is highly unpredictable and the discovery, therefore, of a class of compounds which are readily manufactured, extremely stable to light, and readily compatible with a tremendous variety of organic materials is an outstanding achievement.

Hydroxy benzophenone compounds are well known ultra-violet light absorbers and have been suggested in numerous applications for this function. The derivatives presently available, however, in general suffer from many deficiencies. Wide compatibility with varying chemical structures is lacking. Often, in order to achieve an acceptable degree of stabilization of a given organic material, an amount of absorber is required which is economically unattractive. It has now been discovered that 2'-hydroxy-4'-alkoxy alkylphenone compounds complexed with nickel form a class of ultra-violent light absorbing compounds which are outstanding in their physical and chemical compatibilities with a great variety or organic substrates. These nickel complexes, in addition, give protection far in excess of that which is to be expected from the heretofore known properties of the uncomplexed phenone compounds. The nickel complexes of the 2'-hydroxy-4'-alkoxy alkylphenone compounds thus are characterized as outstanding synergistic combinations which afford about ten times the protection to organic materials as the uncomplexed compounds.

It is therefore an object of the present invention to provide new and useful ultra-violet light absorbers which are outstanding stabilizers for organic materials.

It is another object of the present invention to provide new and useful nickel complexes of 2'-hydroxy-4'-alkoxy alkylphenone compounds which are outstanding absorbers for ultra-violet light and excellent stabilizers for organic materials susceptible to degradation by such radiation.

It is still another object of the present invention to provide processes for the preparation of new and useful nickel complexes of 2'-hydroxy-4'-alkoxy alkylphenone compounds.

It is still a further object of the present invention to provide new and useful organic compositions characterized by outstanding and improved resistance to degradation and deterioration by ultra-violet light.

Still another object of this invention is to provide compositions containing nickel complexes of 2'-hydroxy-4'-alkoxy alkylphenone compounds with improved stability to ultra-violet light deterioration.

It is still a further object of the present invention to provide processes for stabilizing organic materials against the degradative effects of actinic radiation, and especially ultra-violet light.

Other objects will appear hereinafter as the description proceeds.

The nickel complexes of the 2'-hydroxy-4'-alkoxy alkylphenone compounds are a complex union of nickel and the corresponding alkylphenone compound wherein the ratio of nickel to alkylphenone compound may vary from about 1:1 to 1:2. The preparation and description of such nickel complexes will be described below.

The 2'-hydroxy-4'-alkoxy alkylphenone compounds which are employed in the preparation of the nickel complexes of the present invention have the following general formula:

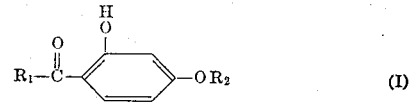

(I)

wherein $R_1$ and $R_2$ are alkyl of from 1 to about 30 carbon atoms and the sum of the carbon atoms in $R_1$ and $R_2$ is at least 8. It is preferred that when either of the substituents $R_1$ and $R_2$ is an alkyl of less than 4 carbon atoms, the other of the substituents $R_1$ and $R_2$ contain at least 6 carbon atoms. In lieu of alkyl, $R_1$ and $R_2$ may be alkenyl of from 3 to about 30 carbon atoms with the above limitations being applicable. The alkyl or alkenyl substituents may also contain substituents such as cyano, halogen, sulfonyl, and the like. Substituents specifically to be avoided are oxy, oxo, thio analoges thereof, and amino.

The general method for obtaining the 2'-hydroxy-4'-alkoxy alkyl phenone compounds to be used in forming the nickel complex compounds of this invention involves a reaction of the corresponding 2'-4'-dihydroxy alkyl phenone with a haloalkane. Where the desired $R_1$ and $R_2$ substituents are available in an 2'-hydroxy-4'-alkoxy alkyl phenone from some other synthesis then, of course, this suggested method need not be used. Another method widely used for preparing these compounds involves a condensation of resorcinol or a resorcinol ether with an aliphatic acid or acid halide of the general formula RCOX (X=OH or halogen) and wherein R corresponds to $R_1$ in Formula I. By the use of resorcinol diethers it is possible to obtain the desired 2'-hydroxy-4'-alkoxy alkyl phenone directly since in the reaction with the aliphatic acid or acid halide, the ether vicinal the point of condensation hydrolyzes under the reaction conditions to a hydroxy group.

Among specific alkyl phenones which may be used to form the nickel complexes or for reaction with a haloalkane are the following (' positions are in the phenyl nucleus):

2',4'-dihydroxy acetophenone
2'-4'-dihydroxy propiophenone
2',4'-dihydroxy butyrophenone
2',4'-dihydroxy isobutyrophenone
2',4'-dihydroxy valerophenone
2',4'-dihydroxy isovalerophenone
2',4'-dihydroxy caprophenone (n-amyl phenyl ketone)
2',4'-dihydroxy isocaprophenone
n-hexyl-(2,4-dihydroxy-phenyl) ketone
n-heptyl-(2,4-dihydroxy-phenyl) ketone
n-octyl-(2,4-dihydroxy-phenyl) ketone
n-nonyl-(2,4-dihydroxy-phenyl) ketone
n-devyl-(2,4-dihydroxy-phenyl) ketone
n-undecyl-(2,4-dihydroxy-phenyl) ketone
n-dodecyl-(2,4-dihydroxy-phenyl) ketone
pentadecyl-(2,4-dihpdroxy-phenyl) ketone
2',4'-dihydroxy stearophenone
2',4'-dihydroxy-2-phenyl acetophenone
2-chloro-2',4'-dihydroxy acetophenone
2-chloro-2',4'-dihydroxy propeophenone
3-cyano-2',4'-dihydroxy propiophenone
3-hydroxy-2',4'-dihydroxy propiophenone
3-chloro-2',4'-dihydroxy butyrophenone
4-cyano-2',4'-dihydroxy butyrophenone
4-chloro-2',4'-dihydroxy butyrophenone
5-chloro-2',4'-dihydroxy caprophenone
2'-hydroxy-4'-isooctyloxy acetophenone
2'-hydroxy-4'-decyloxy acetophenone
2'-hydroxy-4'-dodecyloxy acetophenone
2'-hydroxy-4'-tetradecyloxy acetophenone
2'-hydroxy-4'-hexadecyloxy acetophenone
2'-hydroxy-4'-methoxy laurophenone
2'-hydroxy-4'-ethoxy octanophenone
2'-hydroxy-4'-isobutoxy caprophenone
2',4'-dihydroxy crotonophenone
2'-hydroxy-4'-dodecyloxy crotonophenone
2',4'-dihydroxy pentenophenone
2',4'-dihydroxy hexenophenone
2',4'-dihydroxy octenophenone
2'-hydroxy-4'-methoxy octenophenone To effect the etherification of the 4'-hydroxy group of the 2'-4'-dihydroxy alkylphenone, among numerous procedures, the preferred one, as pointed out above, involves the alkaline condensation with a halo alkane. The preferred halo alkane is a bromo alkane although it is feasible to employ a chloro- or iodoalkane. The alkane moiety of the haloalkane is obviously dependent upon the alkyl group which it is desired to introduce into the 4'-position of the hydroxy alkylphenone compounds. The general procedures for forming the 4'-alkoxy compounds involves refluxing a mixture of the 2'-4'-dihydroxy compound in a suitable solvent such as methyl ethyl ketone in the presence of a small amount of potassium iodide and anhydrous potassium carbonate and with a slight stoichiometric excess of the halo alkane. After reflux, the solvent is distilled off and the residue is drowned in a large excess of water and the pH adjusted to slightly alkaline conditions (about 9–10) with a suitable alkaline material such as aqueous caustic. The resultant material, usually a solid, is then reslurried in water, heated to about 80–100° C. at a pH of 9–10, then cooled to about 10° C. and filtered. To obtain a purer material, the produce may be further recrystallized in the usual manner from alcohol or alcohol in water.

The metal complex of the subject 2'-hydroxy-4'-alkoxy alkylphenone compounds may be prepared by the general procedure of forming a solution of the alkylphenone compound with a stoichiometric amount of caustic in ethanol and the added amount of nickel in the form of a nickel salt such as nickel chloride (e.g., $NiCl_2 \cdot 6H_2O$) and then refluxing this mixture for several hours. The resultant nickel complex which forms may be separated by filtration and purified by washing with alcohol followed by water and additional alcohol. The amount of nickel salt used to form the complex will depend upon what ratio of nickel on a molar basis it is desired to have complexed with the alkylphenone compound. In other words, for a 1:1 complex, equal moles of alkylphenone compound and nickel compound should be used. For a 1:2 complex, one should employ twice as many moles of alkylphenone compound as nickel compound.

The following examples will serve to illustrate the present invention without being deemed limitative thereof. Parts are by weight unless otherwise indicated.

Example 1

Preparation of 2'-hydroxy-4'-dodecyloxy acetophenone:
Into a 1-liter flask there are charged the following reactants:

| | G. |
|---|---|
| 2'-4'-dihydroxy acetophenone (0.5 M.) | 81 |
| Methyl ethyl ketone | 322 |
| 1-bromododecane | 137 |
| Anhydrous potassium carbonate | 70 |

This mixture is refluxed for 19 hours and then about 300 ml. of methyl ethyl ketone is distilled off (about 74% of the ketone charge). The residue in the flask is then drowned in 3 liters of water and the pH of the mixture is adjusted to 9.5 with a 40% by weight aqueous solution of sodium hydroxide. The charge is then filtered and the filter cake is reslurried in 3 liters of water, heated to 85° C. at a pH=9.5 and thereafter cooled to 10° C. The mixture is then filtered and the filter cake is washed with water. The cake is then recrystallized from 1.5 liters of isopropanol containing 3 g. of activated carbon. The product is dried in a desiccator and then air dried at 40° C.

EXAMPLE 2

Preparation of the nickel complex of the compound of Example 1:
Into a 500 ml. flask there are charged the following reactants:

19.1 g. of product of Example 1
2.8 g. potassium hydroxide flakes
200 ml. of ethanol The mixture is stirred until solution is effected and then there is added a solution of 6 g. of nickelous chloride hexahydrate in 100 ml. of ethanol. The entire charge is then refluxed for 2 hours and thereafter filtered after cooling down to 50° C. The filter cake is washed with 250 ml. of ethanol followed by 500 ml. of water and finally with 200 ml. of ethanol. The material is then air dried at slightly elevated temperatures to give a yield of 19.3 g. of complex wherein the ratio of phenone to nickel is 2:1. The product has the following characteristics:

$K_{313m}$=15.6 (in toluene)
M.P.=241–244.6° C.

EXAMPLE 3

100 mg. of the products of Examples 1 and 2 are milled separately into two 100 g. batches of polypropylene and then pressed into a film at 250° C. in a Carver press. These two films are then exposed, along with a third film without any additives, in an Atlas Fadeometer for 100 hours. The film without any additive shows severe degradation as evidenced by many cracks in the film. The film with the hydroxy phenone of Example 1 shows moderate cracking whereas the film with the product of Example 2 shows no visual change.

EXAMPLE 4

The nickel complex prepared in Example 2 is further tested in Avisun 7H unstabilized polypropylene along with 5 commercial products currently used to stabilize this polymer. These commercial stabilizers are:
Commercial Stabilizer: (1) 2-hydroxy-4-octyloxy benzophenone (2) 2-hydroxy-5-octyl phenyl benzotriazole (3) 2-hydroxy-4-dodecyloxy benzophenone (4) nickel phenol-phenolate of o,o'-bis (p-octyl phenol)sulfide (5) butylamine complex of (4)

0.25 parts per hundred parts resin of the stabilizer and a similar amount of 2,6-di-t-butyl-p-cresol are compounded into the polypropylene and then 20 mil films are pressed and exposed in an Atlas Model 60–WR Xenon lamp Fadeometer. The per cent of retention of original tensile strength is determined after 900 hours exposure using an Instron Universal Testing Machine. The results are as follows:

|  | Percent tensile strength retention |
|---|---|
| No U.V. absorber | 0 |
| Compound of Example 2 | 93.8 |
| Commercial stabilizer: | |
| (1) | 12.4 |
| (2) | 32.3 |
| (3) | 21.6 |
| (4) | 4.2 |
| (5) | 9.5 |

The vast superiority of the compound of Example 2 is evident.

EXAMPLE 5

1 g. of the compound of Example 2 is dissolved in 10 g. of acetone and then this solution is stirred into 90 g. of water (at 180° F.) containing 90 mg. of a dispersing agent (Peregal O-nonionic polyoxyethylated fatty alcohol). A 10 g. sample of a "spandex" fabric (elastic polyurethane made from metaphenylene diisocyanate and a $C_4$ di-alcohol diester) is dyed in this bath for ½ hour at 180° F. Excellent stabilizing of the fabric to ultra-violet light degradation is achieved.

EXAMPLE 6

Example 1 is repeated using the following phenones at 0.5 molar amounts in place of 2',4'-dihydroxy acetophenone:

A. 2',4'-dihydroxy propiophenone
B. 2',4'-dihydroxy butyrophenone
C. 2',4'-dihydroxy phenyl n-hexyl ketone
D. 2-chloro-2',4'-dihydroxy acetophenone
E. 3-chloro-2'4'-dihydroxy butyrophenone
F. 2',4'-dihydroxy crotonophenone
G. 2',4'-dihydroxy octenophenone
H. 5-chloro-2',4'-dihydroxy caprophenone
I. 4-cyano-2',4'-dihydroxy butyrophenone

EXAMPLE 7

Example 2 is repeated using separately the dodecyloxy derivatives of Example 6.

EXAMPLE 7A

Example 3 is repeated using separately the nickel complexes prepared in Example 7. In each instance the compounds of this invention show marked superiority over the unmetallized products as well as over the films without any additive.

EXAMPLE 7B

Example 2 is repeated using 2'-hydroxy-4'-(2-chlorallyloxy) laurophenone which has a m.p. of 57.2—58.3° C. and a $K_{max}$=14.9 at 315 m. (in toluene). Excellent results are obtained.

EXAMPLE 8

Example 2 is again repeated using the following compounds:

A. 2'-hydroxy-4'-isooctyloxy acetophenone
B. 2'-hydroxy-4'-decyloxy acetophenone
C. 2'-hydroxy-4'-tetradecyloxy acetophenone
D. 2'-hydroxy-4'-hexadecyloxy acetophenone The acetophenone compounds of 7A–7D are prepared similarly as the dodecyloxy compound of Example 1 except that in place of 1-bromododecane, the corresponding bromoalkane (i.e., 1-bromodecane, 1-bromotetradecane, etc.) in equivalent amounts is used.

EXAMPLE 9

Examples 2 and 7 are repeated except that 12 g. of nickelous chloride are used to yield a 1:1 nickel complex.

EXAMPLE 10

Examples 2 and 8 are repeated using the following ketones:

A. 2'-hydroxy-4'-methoxy laurophenone
B. 2'-hydroxy-4'-ethoxy laurophenone
C. 2'-hydroxy-4'-isobutoxy caprophenone
D. 2'-hydroxy-4'-methoxy octenophenone
E. 2'-hydroxy-4'-allyloxy laurophenone
F. 2'-hydroxy-4'-methoxy stearophenone The 1:2 complex of 10A is particularly outstanding in polypropylene. The complex is a waxy solid with a $K_{max}$=17 at 310 m. (in toluene). Compounds A–F are prepared from the alkyl dihydroxyphenyl ketone and the corresponding alkyl or alkenyl bromide (e.g., methyl bromide, ethyl bromide, allyl bromide, etc. as in Example 1).

The above examples illustrate the preparation of nickel complexes of the present invention and their use in polypropylene and a polyurethane. These complexes may of course be used to protect organic materials in general which are susceptible to ultra-violet degradation. The efficacy and desirability of these compounds for such use, however, will of course depend primarily upon the compatibility with the organic substrate to be protected. In view of the hydrophobic or non-polar character of the compounds of this invention the greatest utility will be with materials which are also non-polar or hydrophobic. In many applications, however, excellent protection will result even though the organic material is not conventionally considered hydrophobic or non-polar. Thus on a relative scale, polyolefins are highly non-polar and hydrophobic, whereas nylons (polyamides), polyesters and polyvinyl acetate would, by comparison, be deemed polar. The compounds of this invention, however, may be used with such materials. Still further, in many liquid aqueous systems, the compounds of this invention may be used in dispersed form or dissolved in a suitable solvent and emulsified in such aqueous system whereby protection may be afforded thereto. The most outstanding performance of the compounds of this invention lies in their utility with polyolefins such as derived from the polymerization of α-olefins which include ethylene, propylene, butene-1, pentene-1, 4-methyl pentene-1, 3-methyl butene-1, and the like. They are also outstanding stabilizers for polyvinyl chloride, polyvinylidene chloride, polystyrene, polyurethanes, among others. In utilizing the compounds of this invention for stabilizing organic materials, the amounts to be employed are not critical and will vary widely depending upon the nature of the organic material, the conditions to which it is to be exposed and the degree of stabilization desired. In general, however, amounts of stabilizer of from about 0.01% to about 10% by weight based on the weight of the organic material may be used, and perferably amounts from 0.1% to about 2% by weight based on the weight of the organic material. The compounds of this invention may be incorporated into the organic material in any convenient manner, again depending upon the nature of the compositions to be stabilized. The compounds may be dissolved in a suitable solvent or as illustrated in the examples, milled directly into the composition where this is feasible. The latter is particularly desirable in working with plastic materials, especially since solvents are usually not deemed advisable. This technique is particularly advantageous with the compounds of this invention because of the low degree of volatility at elevated temperatures, such as normally encountered in the milling and processing of plastic materials. This is in contradistinction to the majority of other ultra-violet stabilizers and especially of the benzophenone types which are not so characterized. In the employment of the compounds of this invention for stabilizing organic materials, it is of course clear and obvious that other materials may be used therewith, and especially those which are conventional with the organic product in question. Thus, in the case of plastic or resin materials, the usual plasticizers, films, antioxidants, and other heat and light stabilizers may be used. In the case of fibers and textile materials, the usual finishing agents, brighteners and textile auxiliaries may also be used.

Other variations in and modifications of the described processes which will be obvious to those skilled in the art can be made in this invention without departing from the scope or spirit thereof.

We claim:
1. An organic composition having a basis of polyolefin, polyamide, polystyrene, polyvinyl acetate, polyvinyl chloride, or polyvinylidene chloride stabilized against the degradation effects of actinic radiation containing as a stabilizer from about 0.01% to about 10% by weight based on the weight of said polymer of a nickel complex of a phenone compound of the formula:

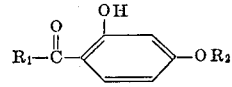

wherein $R_1$ and $R_2$ are selected from the group consisting of alkyl of from 1 to about 30 carbon atoms and alkenyl of from 3 to about 30 carbon atoms and the sum of the carbon atoms in $R_1$ and $R_2$ is at least 8, and wherein the mole ratio of nickel to phenone compound is from about 1:1 to about 1:2.

2. A solid poly-α-olefin composition containing as a stabilizer from about 0.01% to about 10% by weight based on the weight of solid poly-α-olefin of a nickel complex of a phenone compound of the formula:

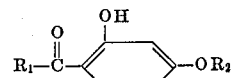

wherein $R_1$ and $R_2$ are selected from the group consisting of alkyl of from 1 to about 30 carbon atoms and alkenyl of from 3 to about 30 carbon atoms and the sum of the carbon atoms in $R_1$ and $R_2$ is at least 8, and wherein the mole ratio of nickel to phenone compound is from about 1:1 to about 1:2.

3. A composition as defined in claim 2 wherein the solid poly-α-olefin is polyethylene.

4. A composition as defined in claim 2 wherein the solid poly-α-olefin is polypropylene.

5. A composition as defined in claim 1 wherein said mole ratio of nickel to phenone compound is 1:1.

6. A composition as defined in claim 1 wherein said mole ratio of nickel to phenone compound is 1:2.

References Cited

UNITED STATES PATENTS 2,976,259   3/1961   Hardy et al. _____ 260—45.95

FOREIGN PATENTS 943,937   12/1963   Great Britain.

DONALD E. CZAJA, *Primary Examiner.*

V. P. HOKE, *Assistant Examiner.*